US012609530B2

(12) United States Patent
Kreikebaum et al.

(10) Patent No.: US 12,609,530 B2
(45) Date of Patent: Apr. 21, 2026

(54) DYNAMIC COMPUTATION AND HEIRARCHICAL CONTROL OF ASSETS OF A POWER GRID USING SHUNT AND SERIES CONNECTED FACTS DEVICES

(71) Applicant: Smart Wires Inc., Union City, CA (US)

(72) Inventors: Frank Kreikebaum, Seattle, WA (US); Haroon Inam, San Jose, CA (US)

(73) Assignee: Smart Wires Inc., Durham, NC (US)

( * ) Notice: Subject to any disclaimer, the term of this patent is extended or adjusted under 35 U.S.C. 154(b) by 768 days.

(21) Appl. No.: 17/851,698

(22) Filed: Jun. 28, 2022

(65) Prior Publication Data

US 2023/0170699 A1     Jun. 1, 2023

Related U.S. Application Data

(60) Provisional application No. 63/284,446, filed on Nov. 30, 2021.

(51) Int. Cl.
*H02J 3/06* (2006.01)

(52) U.S. Cl.
CPC .............. *H02J 3/06* (2013.01); *H02J 2203/20* (2020.01)

(58) Field of Classification Search
None
See application file for complete search history.

(56) References Cited

U.S. PATENT DOCUMENTS

2015/0112496 A1* 4/2015 Fisher ............... H02J 13/00034
                                                        700/298
2017/0237255 A1* 8/2017 Inam ................. H02J 13/00034
                                                        700/295

* cited by examiner

*Primary Examiner* — Sean Shechtman
(74) *Attorney, Agent, or Firm* — Womble Bond Dickinson (US) LLP

(57) ABSTRACT

A flexible alternating current transmission system (FACTS)-based shunt system is described for use in a hierarchy in a high-voltage or medium-voltage power grid. The shunt system includes a FACTS-based shunt device, a communication link, and a shunt controller. A hierarchy in the power grid includes a supervisory utility communicably coupled to localized intelligence centers (LINCs). Each LINC is communicably coupled to one or more impedance injection modules (IIMs) that are coupled to the power grid. The hierarchy has an optimization engine. The shunt controller, of the shunt system, is to communicate and cooperate with one or more of the LINCs in the hierarchy. The shunt controller is to operate the FACTS-based shunt device in accordance with such communication and cooperation with the LINCs, to provide voltage stability to the power grid through hierarchical control according to the supervisory utility, the LINCs and the optimization engine.

20 Claims, 11 Drawing Sheets

200

FACTS based sensor
(for monitoring and measurements reporting)

210

Capability to measure Environmental Conditions
including Temperature and Humidity

212

High-Speed Communication Capability
[via high-speed communication link]

303

300

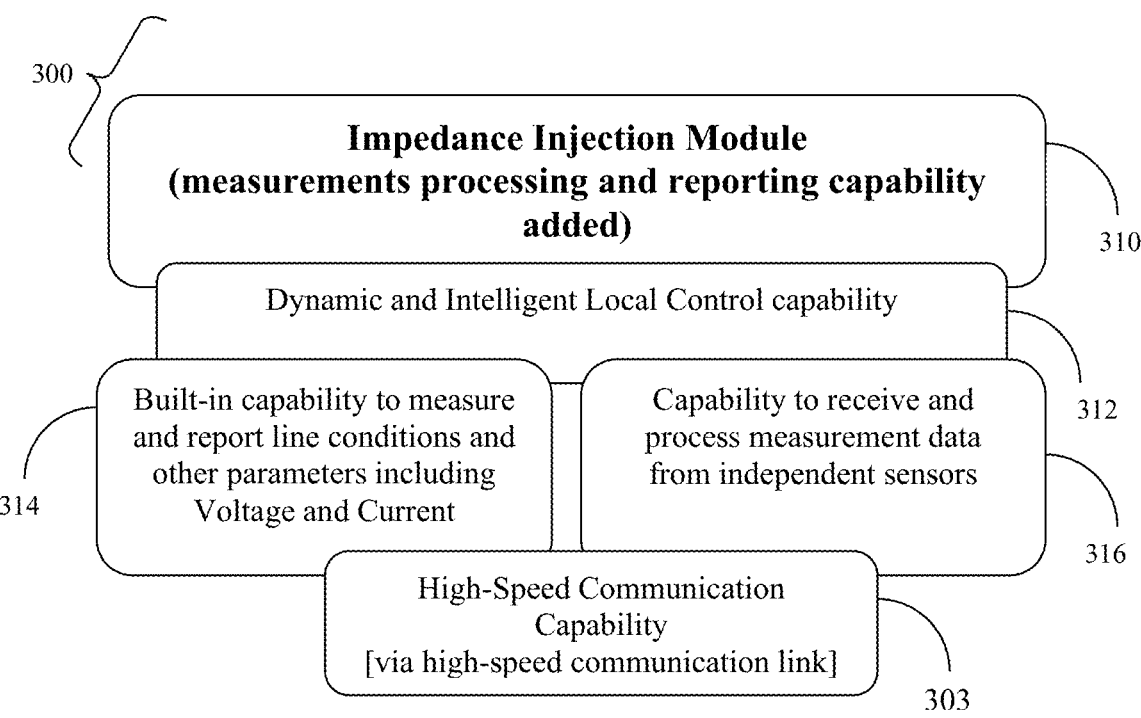

**Impedance Injection Module
(measurements processing and reporting capability
added)**

310

Dynamic and Intelligent Local Control capability

312

Built-in capability to measure
and report line conditions and
other parameters including
Voltage and Current Capability to receive and
process measurement data
from independent sensors

314

316

High-Speed Communication
Capability
[via high-speed communication link]

DYNAMIC COMPUTATION AND HEIRARCHICAL CONTROL OF ASSETS OF A POWER GRID USING SHUNT AND SERIES CONNECTED FACTS DEVICES

CROSS-REFERENCE TO RELATED APPLICATIONS

This application claims the benefit of U.S. Provisional Application No. 63/284,446 filed on Nov. 30, 2021, the disclosure of which is incorporated herein by reference.

TECHNICAL FIELD

The present disclosure relates to systems for intelligent distributed power flow control, from distributed generation to distributed loads, with supervision of a power grid system using a number of self-aware intelligent flexible alternating current transmission system (FACTS), both shunt and series types to enable dynamic computation and control of the assets outside, at the edges and within the power grid.

BACKGROUND

Most prior art power utilities use energy management system (EMS)/supervisory control and data acquisition (SCADA) control systems for control of the power grid systems. These control systems provide connection and communication between the different types of controllers, such as those associated with capacitor banks, relays, protection systems, bypass systems sensing devices, generating stations, distribution points and intermediate substations that are used to control voltages over the system, power factor, limit power flows, and adjust for load imbalances over the power grid lines, and provide interactive control of the power transmission on the grid.

In order for the power system to work efficiently, the stability of the system during power transfer from generation to load has to be maintained. That means that the power grid controls have to ensure power flow over the high voltage (HV) transmission lines of the grid and protect the system against transient, oscillatory and voltage instabilities.

With the advent of distributed generation from natural green resources such as wind, geothermal, solar and wave energy, which are not predictable, the control of stability of the grid has become an important consideration for all power grids. The recent advances in non-conventional generation, such as wind, solar, geothermal, tidal and wave energy systems, that respond to unpredictable weather and environment-related characteristics and are dispersed across geographical locations, coupled with the cyclic nature of consumer demand for power, has made the optimization of power flow over the grid from generation to distribution based on models established and controlled by the utilities difficult. Further the use of FACTS based control and connection of these non-conventional generation sources to the grid has resulted in reduced capacity to supply reactive power to the power grid unlike the traditional rotating power sources.

The prior art FACTS based coupling and control capabilities are able to react to some of the needs of the Power grid, but are not fast optimum solutions for control of power flow over the power grid of the grid.

The addition of power storage and other FACTS devices within and outside the edge of the grid are being attempted to improve the overall grid system performance. These FACTS and power storage devices coupled to the power grid need to be integrated with the power grid with control and communication capability to work efficiently.

In addition, environmental issues, health concerns, climate controls, view aesthetics, and regulations at various levels of governments are now forcing the utilities to deal with a set of new issues and initiatives when operating the power grids. It will be very useful to have the capability to integrate the new distributed FACTS-based control of generation capacity, the power storage devices etc. with the required compliances, regulations and rules, so that a single system with standardized control and communication capability for grid control can be established. Such a capability will provide the power grid system with the capability to react to changes proactively using all the resources available to it before power related issues develop and become critical.

An improved system that can address the totality of grid system stability is currently needed as discussed before. Such a system should also be able to provide the capability to the system utility to implement any or all of the objectives functions of the power grid taking into account any operational constraints imposed on the utility.

SUMMARY

Various embodiments of a power grid, a hierarchy in a power grid, hierarchical control in a power grid, and a shunt system for use in a hierarchy in a power grid are described herein.

One embodiment is a flexible alternating current transmission system (FACTS)-based shunt system, for a high-voltage or medium-voltage power grid. The shunt system includes a FACTS-based shunt device, a communication link, and a shunt controller. A hierarchy in a power grid, for context in this embodiment, includes a supervisory utility and multiple localized intelligence centers (LINCs). Each LINC is communicably coupled to one or more impedance injection modules (IIMs) that are coupled to the power grid. The hierarchy has an optimization engine. The shunt controller, of the shunt system, is to communicate and cooperate with one or more of the LINCs. The shunt controller is to operate the FACTS-based shunt device in accordance with such communication and cooperation, to provide a capability for optimization of operational parameters to the power grid, the operational parameters comprising voltage stability, power factor control, power flow control, control of load imbalances, enhance grid inertia, and locally react to disturbances on the grid. This capability is provided to the power grid through hierarchical control according to the supervisory utility, the LINCs and the optimization engine.

One embodiment is a method, performed by a shunt controller of a FACTS-based shunt system in a high-voltage or medium-voltage power grid. The method includes communicating and cooperating with one or more localized intelligence centers (LINCs) in a hierarchy in the power grid. Each LINC is communicably coupled to one or more impedance injection modules (IIMs) that are coupled to the power grid. The hierarchy includes a supervisory utility communicably coupled to the LINCs, and the hierarchy has an optimization engine. The method includes operating a FACTS-based shunt device in accordance with such communication and cooperation with the LINC(s). This operating the FACTS-based shunt device is to provide voltage stability to the power grid through hierarchical control according to the supervisory utility, the LINCs and the optimization engine.

One embodiment is a tangible, non-transitory, computer readable media that has instructions on the media. The instructions, when executed by a processor, cause the processor to perform a method. The method includes communicating and cooperating with one or more localized intelligence centers (LINCs) in a hierarchy in a power grid. Each LINC is communicably coupled to one or more impedance injection modules (IIMs) that are coupled to the power grid. The hierarchy includes a supervisory utility communicably coupled to the LINCs. The first hierarchy has an optimization engine. The method includes operating a FACTS-based shunt device in accordance with such communication and cooperation with the LINC(s). This operating the FACTS-based shunt device is to provide voltage stability to the power grid through hierarchical control according to the supervisory utility, the LINCs and the optimization engine.

BRIEF DESCRIPTION OF THE DRAWINGS

Embodiments of the disclosure are illustrated by way of example and not limitation in the figures of the accompanying drawings in which like references indicate similar elements.

FIG. 3 is a diagram illustrating an impedance injection module (IIM) according to one embodiment.

DETAILED DESCRIPTION

Figure 1A:
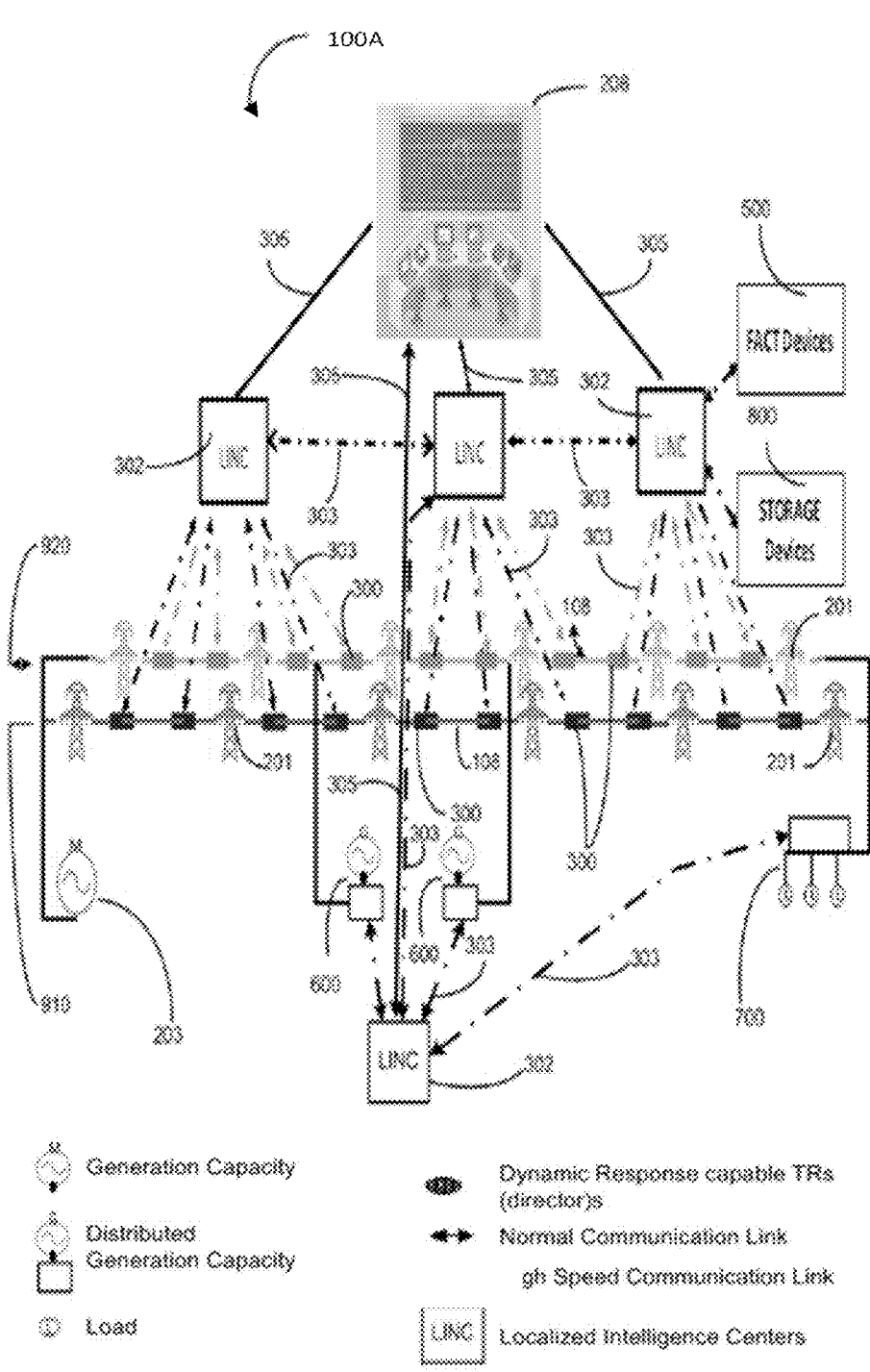
FIG. 1A is a block diagram illustrating a total power system from generation to distribution with distributed local sub-cyclic response capability and hierarchical monitoring and supervision capabilities mainly including series FACTS devices for coupling and control of the assets of the grid to provide for line balancing and power flow control.

Various embodiments and aspects of the disclosure are described with reference to details discussed below, and the accompanying drawings illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

A system and method for power grid control, that enables hierarchical control of the total power grid from generation to distribution, with communication and coordination is described. The hierarchical control extends from local segments with intelligent and sensing enabled impedance injection modules (IIM)s coupled to them to local areas of a power grid with IIMs communicably connected and controlled by individual local intelligence centers (LINC)s to control of a subsection of the power grid controlled by communicably interconnected and coordinated LINCs to utility supervisory control is disclosed. The disclosure extends the control and communication capability within, at the edge, and outside the edge of the power grid using intelligent and self-aware FACTS devices. The FACTS devices comprising both series and shunt devices for total control of the network including for power flow and voltage stability. The disclosure provides for control of a distribution network, energy storage systems and generation sources as an integrated system allowing optimization of power grid operation from generation to distribution. This control capability enables the supervisory utility to implement and manage policy issues, such as standard compliance, carbon emission reduction, right-of-way management, and conformance to environmental regulations, comprising EMI compliance, noise reduction, etc. while simultaneously enabling optimization of energy cost, network reliability, and asset utilization and life.

A system for power flow control on the transmission lines using distributed impedance injection modules attached to the of the power grid has been proposed in U.S. patent application Ser. No. 15/068,397 currently issued as U.S. Pat. No. 10,097,037 titled: "System and Method for Distributed Grid Control with Sub-Cyclic Local Response Capability", the disclosure of which is incorporated herein by reference.

A system has been proposed for integrated control of the power grid for power flow control and for control of oscillations and other disturbances in the U.S. patent application Ser. No. 15/428,906, currently issued as U.S. Pat. No. 10,218,175 and its continuation Ser. No. 16/282,172 currently issued as U.S. Pat. No. 10,749,341, both of which are titled: "DYNAMIC AND INTEGRATED CONTROL OF TOTAL POWER SYSTEM USING DISTRIBUTED IMPEDANCE INJECTION MODULES AND ACTUATOR DEVICES WITHIN AND AT THE EDGE OF THE POWER GRID", the disclosures of which are incorporated herein by reference. These patents provide a capability for fast response to sensed power flow changes at local level. Additionally, the use of fast communication between system elements in the neighborhood provides for adaptive flow control and information transfer from the local centers established, to the main control centers for supervisory action create a system that provides for a hierarchical control of power flow over the grid.

Additionally, a system and method has been proposed using the series connected FACTS devices for integrated and control of the power grid and achieving at least one objective function of the power grid, in the currently allowed U.S.

application Ser. No. 16/559,433 (allowed on Jun. 23, 2021 as U.S. Pat. No. 11,159,046) and its continuation application Ser. No. 17/461,609, filed on Aug. 30, 2021, both of which are titled "Dynamic Computation and Control of Distributed Assets at the Edge of a Power Grid", the disclosures of which are incorporated herein by reference.

In order to meet the identified requirement, the fully integrated hierarchical control capability is described. The improved system with alternate and efficient power grid control using the hierarchical control capability based on distributed and localized control of power flow over the HV and MV (medium voltage) transmission lines of the grid and using intelligent and self-aware shunt and series Flexible Alternating-Current Transmission System (FACTS) based control devices on the power grid that work in coordination with distributed sensors is what is proposed. IEEE defines the FACTS devices as "alternating current transmission system incorporating power electronic-based and other static controllers to enhance controllability and increase power transfer capability". All the components of the proposed system are communicably linked with appropriate speed communication capability which include sub-cyclic communication capability where needed, to enable fast and reliable response by the system to provide the needed power grid system stability under all operating conditions. These intelligent and self-aware FACTS devices, which have enough sensing and processing capability, are able to identify, by themselves or based on input from the communicably coupled distributed sensors, and react in a very fast manner to, the changes in power flow and also respond to changes in power line characteristics at a local level. These intelligent FACTS devices have series connected IIMs for power flow in the transmission lines of the power grid and in other intelligent and self-aware series and shunt connected FACTS devices that are used to couple and control power flow into the power grid from traditional and distributed generation capacity and storage capacity, and couple and control power flow out of the power grid into loads coupled to the power grid using demand response capable FACTS devices for power supply to the loads based on demand.

The IIMs typically have multiple transformer-less FACTS devices as impedance injection units (IIUs) connected in series, parallel, or series-parallel combinations, which provide a capability to have localized control of line current flow and line balancing of transmission line segments to which they are coupled. The shunt FACTS devices used to connect and control the flow of power into and out of the power grid and control the voltage of the power grid comprise mainly Static Var Compensators (SVCs), and Static Synchronous Compensators (STATCOMs).

It has been shown that series connected FACTS devices such as IIMs are able to provide reliable control of power flow/transfer over the transmission lines of the grid and take care of disturbances on the power transmission lines of the power grid, as described previously. But the series connected FACTS devices are not optimum for providing voltage stability for the HV, MV power grids or distribution grids. Voltage stability is the ability of power system to maintain steady acceptable voltages at all power buses in the system under operating conditions. One of the important tasks of a power utility is to keep voltage within an allowable range for high quality customer services. As power systems get stressed with higher power demand, voltage instability happens. Voltage collapse is the process by which events accompanying voltage instability leads to unacceptable voltage profile in a significant part of the power system.

The voltage instability when it is allowed to decay the voltage bellow a threshold is non recoverable and can lead to collapse of the power grid leading to a partial or full power interruption in the system. Voltage collapse has hence become an increasing threat to power system security and reliability.

Voltage instability occurs when the power grid is unable to provide sufficient reactive power demanded by reactive loads, such as inductive or capacitive loads connected to the power grid. As discussed earlier the new distributed generation sources coupled to the grid using FACTS based controllers are not always able to supply the needed reactive power. The solution to this problem is providing adequate reactive power support to the critical buses The only way to save the system from voltage collapse is to reduce the reactive power load or add additional reactive power capability prior to the power grid voltage reaching the point of voltage collapse.

The FACTS based shunt devices such as Static Var Compensator (SVC), and Static Synchronous Compensator (STATCOM) and Unified Power Flow Controllers (UPFCs) are able to provide the power grid with capability for enhanced control for voltage instability. UPFCs are systems that include both series and shunt compensators.

The new system disclosed, when implemented as a combination of FACTS based distributed series impedance injectors and shunt control devices with all the sub-system elements made intelligent, will be able to optimize the distributed power generation. and use the power storage capabilities efficiently. It will also provide efficient and optimized management for distribution of power while optimizing the grid operation. It will also help speed up recovery from problems caused by disturbance such as oscillations on the grid and improve grid utilization. Such systems with communication and control capability, will also be able to enable the system utility to incorporate policy/regulation/rule constraints into the control vectors for implementing a number of useful and required objective functions, using the intelligent integrated series and shunt FACTS based controls, to optimize one or more of energy cost, network reliability, asset utilization and life of the power grid.

A system enabling hierarchical control with communication and coordination, from local segments and subsections of a power grid to utility supervisory control is disclosed. The disclosure extends the control and communication capability within, at the edge, or outside the edge of the power grid using intelligent and self-aware FACTS devices. The FACTS devices comprising both series and shunt devices for total control of the network including for power flow and voltage stability. The disclosure provides for control of a distribution network, energy storage systems and generation sources as an integrated system allowing optimization of power grid operation from generation to distribution. This control capability enables the supervisory utility to implement and manage policy issues, such as standard compliance, carbon emission reduction, right-of-way management, and conformance to environmental regulations, comprising EMI compliance, noise reduction, etc. while simultaneously enabling optimization of energy cost, network reliability, and asset utilization and life.

A system architecture for enabling localized intelligent control of power flow at a local area of the grid with communication and coordination of control and a supervisory utility-based control of power input, storage and delivery to loads is proposed. The localized power flow control is by series connected self-aware FACTS based impedance injection modules (IIMs) attached to local transmission line segments that are enabled to recognize problems of power flow, generate and inject inductive and capacitive impedance on to the transmission line segments to which they are coupled. The addition of shunt FACTS controllers within the grid system help to optimize the power factor of the load and supply any reactive load component that are necessary for voltage stability of the grid. This enables the system utility to control both the power flow over the grid and the voltage stability of the power grid.

These applications extend a FACTS-based control and high-speed communication capability to all connections of sources, storage, and load to the power grid. The above described embodiments use intelligent and self-aware FACTS controller devices that include distributed or deployed series connected impedance injection modules (IIMs) for power flow control over the high-voltage (HV) and medium-voltage (MV) power lines of the grid, FACTS-based controller devices at and outside the edge of the power grid for controlling power sources, loads, storage, and other sensor devices that can sense the conditions of the surrounding environment and any changes in the characteristics of the components of the power system. Having interconnected and communicably coupled shunt devices further enhance the system voltage stability and capability to improve load power-factor by supplying any needed reactive power on demand. An integrated communication capability with high-speed local communication and normal supervisory communication to a utility is used to provide hierarchical control capability to the power grid using the FACTS controllers. The use of these intelligent connected FACTS devices hence provides an integrated capability for local conditions sensing and hierarchical control of the total power grid including traditional generators, distribution network, storage devices, and the distributed generation sources. The application also provides for high-speed communication for local coordination and control of the power system and normal communication to a utility for supervisory control.

It has been found that series connected power flow controllers are not ideally suited for providing a voltage stability to the grid system when sudden reactive power requirements arise that tend to reduce the voltage stability of the grid system. Hence it is necessary to provide the capability to the grid system by providing FACTS based shunt devices coupled to the weak points of the grid to provide voltage support by enabling reactive power availability on demand. This is one reason for the addition of the FACTS based shunt devices and control capability to the power grid hierarchical control capability. These FACTS based shunt control devices are also coupled communicably to the local intelligence centers (LINCs) and therethrough to the utility to enable full hierarchical control capability within the grid system, The integrated and hierarchical control capability of the grid system defined herein also enables optimization of a power grid from generation to distribution. Incorporating real-time measurement data, including voltage, current, temperature, humidity, noise, wind speed, geomagnetically induced current (GIC) vibration, allows the optimization engine to extend the operational envelopes by dynamically de-rating line to match the current conditions without assuming the static worst-case operating scenarios. This control capability further enables the utility to automatically manage policy issues such as standard compliance, carbon emission limits, right-of-way management requirements and environmental issues such as EMI limits, sound emission limits, etc. This also allows the utility to optimize energy cost, network reliability, and asset utilization and life. The current application covers the optimized automatic management of policy issues using the self-aware and intelligent distributed FACTS controllers and sensors that are integrated across the power generation-distribution system with the high-speed local control capability and the supervisory control capability.

According to some embodiments, a hierarchical power grid control system with an optimization capability based on real time environmental inputs, real time operational characteristics and additional constraints for a high-voltage or medium-voltage power grid is described. The system uses inputs from sensors distributed over the power grid to measure real time data on system operation and local environmental conditions and feed into an optimization engine with available constraints and system objectives to be achieved. The optimization engine out puts control instructions to communicably coupled FACTS based controllers that include both series and shunt control units to achieve one or more system objectives set for the power grid. The series connected FACTs based controllers enabling effective power flow control and line balancing of the power flow over the grid system and the FACTS based shunt controllers operating to provide voltage stability, delivery of current, power factor control, control of load imbalances, enhancement to grid inertia, and/or local reaction to disturbances on the grid, to the grid system. The FACTS devices on the grid system include localized intelligence centers, transmission lines to transport power at high-voltage or medium-voltage from power generators to substations or other distributed loads, sensors coupled to and collectively distributed over or deployed along the transmission lines, with each sensor being configured to measure environmental conditions of its respective transmission line, impedance injection modules (IIMs) coupled to and deployed along the transmission lines, with each IIM being configured to inject voltage or impedance into its respective transmission line and to communicate with at least one localized intelligence center, and a supervisory utility configured to communicate with the power generators, the substations, and the localized intelligence centers. Further they also include shunt devices such as static VAR compensators (SVCs) that provide the reactive power support to the grid system. In one embodiment, the localized intelligence centers, the sensors, the IIMs, and the supervisory utility collectively provide hierarchical monitoring and control of the power grid, with the IIMs locally responding to specific injection settings provided by the localized intelligence centers to control power flow and the communicably coupled FACTS based shunt devices responding to specific control instructions from the localized intelligence centers to which they are coupled to enhance the voltage stability of the transmission lines of the grid system. In one embodiment, the localized intelligence centers provide the specific injection settings and control instructions based on optimal decisions and settings received from the supervisory utility to optimize power flow and voltage stability of the power grid.

According to another embodiment, a system for optimization of power grid operation and hierarchical monitoring and control of a power grid is described. The system includes sensors coupled to and collectively distributed over or deployed along high-voltage (HV) or medium-voltage (MV) transmission lines of the power grid, with each sensor being configured to measure environmental conditions of its respective transmission line. The system further includes IIMs coupled to and deployed along the transmission lines. Each IIM being configured to inject voltage or impedance into its respective transmission line and to communicate with at least one localized intelligence center. In one embodiment, the IIMs locally respond to specific injection settings provided by localized intelligence centers to control power flow of the transmission lines. The system further including one or more FACTS based shunt device, such as SVCs that are coupled to the grid, is able to provide reactive power on demand to reduce or eliminate voltage instability in the power system. Each of the SVCs has an intelligent control unit to enable it to operate independently based on voltage conditions sensed on the grid system. Each SVC can be communicably coupled to at least one localized intelligence center for transferring data and receiving control inputs when needed from the hierarchical control capability of the grid system, including both the localized intelligence centers and the system utility, and further transferring data and responses back to the system utility. In one embodiment, the localized intelligence centers provide the specific injection settings and control instructions based on optimal decisions and settings received from a supervisory utility to the IIMs and the FACTS based shunt devices for optimizing the operation of the power grid.

According to yet another embodiment, a method and system for optimized hierarchical monitoring and control of a power grid is described. The method includes receiving environmental conditions of HV or MV transmission lines of the power grid. The method further includes receiving, from a number of IIMs and other sensing devices coupled to and deployed along the transmission lines, voltage or current of the HV or MV transmission lines. The method further includes identifying objective functions and constraints, and determining optimal decisions and settings based on the environmental conditions of the transmission lines, the voltage or current of the transmission lines, the objective functions, and the constraints. And the method includes controlling power flow or voltage of the transmission lines using the optimal decisions and settings.

According to still another embodiment, a high-voltage or medium-voltage power grid is described. The power grid includes localized intelligence centers and transmission lines to transport power at high-voltage or medium-voltage from power generators to substations or other distributed loads. Impedance injection modules (IIMs) are coupled to and deployed along the transmission lines, with each IIM being configured to inject voltage or impedance into its respective transmission line. A plurality of FACTS based shunt devices such as SVCs being coupled to the grid at recognized points of weakness to provide reactive power when needed to prevent voltage instability in the supply. Each SVC and IIM being communicably coupled to at least one localized intelligence center, and therethrough to a supervisory utility configured to communicate with the power generators, the substations, and the localized intelligence centers. In one embodiment, the localized intelligence centers, the sensors, the IIMs, the SVCs and the supervisory utility collectively provide hierarchical monitoring and control of the power grid, with the IIMs locally responding to specific injection settings provided by the localized intelligence centers to control power flow of the transmission lines and the SVCs responding to reactive power requirements. In one embodiment, the localized intelligence centers provide the specific injection settings and control instructions based on optimal decisions and settings received from the supervisory utility.

The disclosure is generally directed at providing a capability for the power generation-distribution system to achieve optimized operation capability while meeting policy goals. This is possible with the use of distributed or deployed IIMs on the power grid, the intelligent SVCs coupled to the grid and the FACTS based intelligent and distributed control of the connected generators, loads, storage devices, and control devices at the edge of the grid. In addition, FACTS based sensor modules and independent sensors are also implemented on the power system that can sense any changes in the local environment and any changes in the characteristics of the components of the power system.

FIG. 1A is a block diagram illustrating a total power system from generation to distribution with distributed local sub-cyclic response capability and hierarchical monitoring and supervision capabilities. In one embodiment, power grid system 100A of FIG. 1A may be the total power system described in co-pending U.S. application Ser. No. 15/428, 906, entitled "Dynamic and Integrated Control of Total Power System Using Distributed Impedance Injection Modules and Actuator Devices within and at the Edge of the Power Grid."

As shown, power grid system 100A includes generation capacity 203, for example including large conventional generation stations, that is connected to the HV/MV power grids enabled for power transfer over the high-voltage and medium-voltage transmission lines 108 suspended from transmission towers 201. In FIG. 1A, there are two HV/MV power grids 910 and 920, though any number of power grids may exist in power grid system 100A and associated distributed impedance injection modules (IIMs) 300, and actuator devices 500 that are enabled with distributed standardized control and communication capabilities. HV/MV power grids 910 and 920 are the HV/MV power transmission systems that transport power at high-voltage or medium-voltage from the power generators to the sub-stations or other distributed loads. Distributed or deployed IIMs 300 are attached to the HV/MV power grids 910 and 920 to control the power flow on the HV/MV transmission lines 108. Distributed or deployed IIMs 300 may be self-aware with built-in capability or intelligence to recognize problems on transmission lines 108. Actuator devices 500 may be FACTS devices connected to the HV/MV power grids 910 and 920 enabled with high-speed (sub-cyclic) communication capability and FACTS-based control capability. In one embodiment, actuator devices 500 may include one or more of: static synchronous series compensators (SSSC), static synchronous compensators (STATCOMs), unified power-flow controllers (UPFCs), interline power-flow controllers (IP-FCs), and/or other electronic systems for monitoring and control of the power in/out flow and voltage control over the HV/MV power grids 910 and 920.

Still referring to FIG. 1A, power grid system 100A uses the capabilities established for sub-cyclic control and appropriate communication for all the distributed or deployed IIMs 300, actuator devices 500, and miscellaneous FACTS-coupled FACTS controlled devices, such as distributed generators 600, energy storage devices 800, etc., that are inside, at the edge and outside the edge of the power grids 910 and 920 to provide a distributed but integrated sub-cyclic control and response capability to the total power system. These enable optimization of the operation of the power grid system 100A from generation to distribution. Distributed generators 600 refers to the distributed generation capability (other than the large conventional generation stations that provide generation capacity 203) that could be inside, at, or outside the edge of the HV/MV power grids 910 and 920 but are coupled to the HV/MV power grids 910 and 920 with FACTS-based control capability and enabled with high-speed communication capability. These include, for example, wind energy farms, solar energy farms, bioenergy units, wave energy units, etc. that are typically nonconventional producers of energy. This also may include all conventional distributed generation sources but not traditional large generation capabilities, such as pre-existing thermal power plants, atomic power plants, hydroelectric plants etc., that are controlled directly by the supervisory utility 206. Supervisory utility 206 refers to the supervisory entity enabled for central monitoring, modelling and control of power grid system 100A having communication links to the LINCs 302 for data collection and providing system control. Energy storage devices 800 are distributed energy storage capability typically inside, at, or outside, the edge of the HV/MV power grids 910 and 920 but coupled to the HV/MV power grids 910 and 920 with FACTS-based control and enabled with high-speed communication. The edge of the HV/MV power grids 910 and 920 refers to a boundary of the HV/MV power grids 910 and 920, with some temporal and/or spatial functionality outside the direct control of utilities and distribution operators.

FIG. 1A shows the distributed or deployed IIMs 300, local intelligence centers (LINCs) 302, actuator devices 500, energy storage devices 800, and distributed generators 600, as well as distributed loads 700 with demand-response capabilities, are all with control capability that is typically FACTS-based and are interconnected locally using the high-speed communication provided by high-speed communication links 303 associated with each of the devices, e.g., communication modules on devices. This communication capability is provided through the nearest LINC 302, shown in FIG. 1A, for localized communication and control supervision. In one embodiment, distributed loads 700 refer to power distribution systems that are inside, at, or outside the edge of the HV/MV power grids 910 and 920 but are coupled to the HV/MV power grids 910 and 920 with or without FACTS-based control and enabled with high-speed communication. This concept has been included in an allowed patent application Ser. No. 16/559,433, titled "Dynamic Computation and Control of Distributed Assets at the Edge of a Power Grid", the disclosure of which is incorporate herein by reference.

The LINCs 302 are also interconnected with high-speed link connections for high-speed inter-LINC communication between neighboring local areas. The LINCs 302 are further connected to supervisory utility 206 using communication connections 305, which may be slower than the high-speed communication links 303, to enable data transfer and overall supervisory control of the power grid system 100A.

Figure 1B:
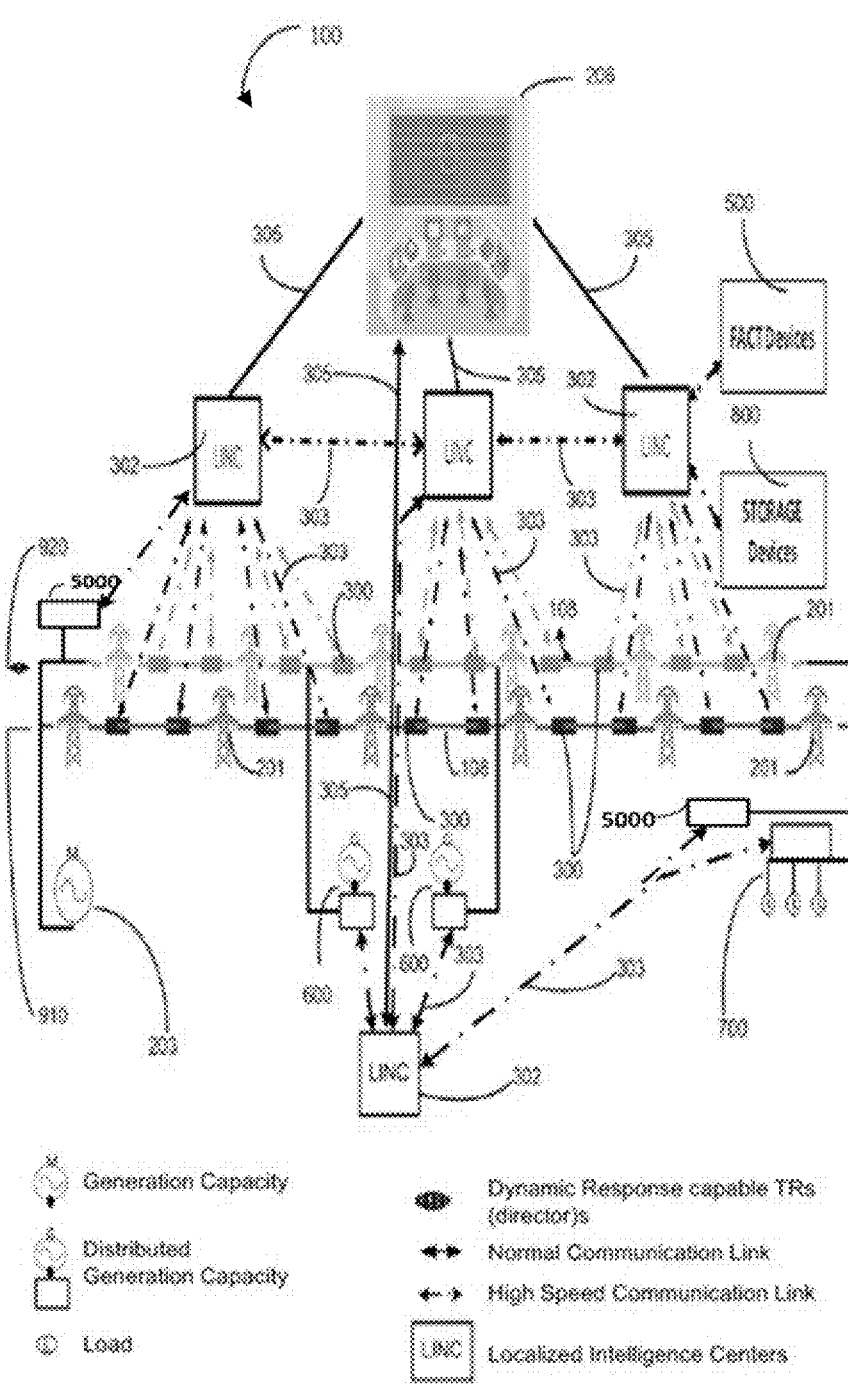
FIG. 1B is a block diagram illustrating a total power system that includes the use of FACTS based shunt control devices, such as SVCs, within a power grid that can provide the additional capability for voltage stability.

FIG. 1B is a block diagram illustrating a total power system from generation to distribution with distributed local sub-cyclic response capability and hierarchical monitoring and supervision capabilities according to an embodiment. In FIG. 1B, power grid system 100 may further include the FACTS based shunt devices, such as static VAR compensators (SVCs) in one or more shunt device systems 5000 (see also FIG. 5) coupled to the power grid to provide reactive power needs of the loads. This addition prevents possible voltage instabilities that can develop when large reactive power needs arise in the grid system. These voltage instabilities if not controlled by providing the needed reactive power, can lead to system failures.

Figure 2:
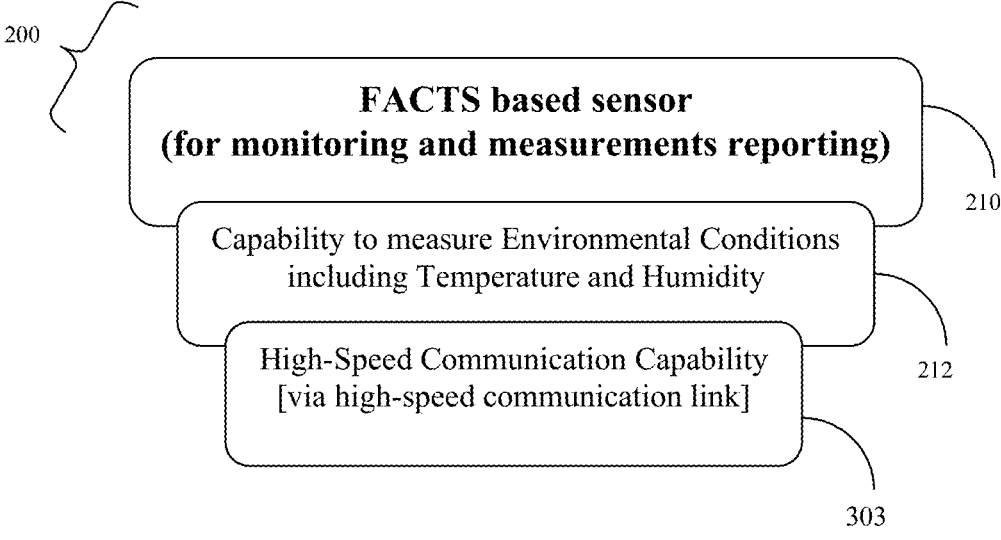
FIG. 2 is a diagram illustrating a FACTS-based sensor module according to one embodiment.

FIG. 2 is a diagram illustrating a FACTS-based sensor module according to one embodiment. In FIG. 2, FACTS based sensor module 200 may include FACTS based sensor 210 having capability 212 to measure and report environmental conditions, including temperature, humidity, noise, wind speed, geomagnetically induced current (GIC) vibration, using high-speed communication capability of high-speed communication links 303 (e.g., high-speed transceiver) to one or more LINCs 302, with connectivity through high-speed communication links 303 (as shown in FIG. 1B) to provide the sub-cyclic local response. In one embodiment, FACTS-based sensor module 200 can be built-in as part of IIM 300, or completely independent from IIM 300 but communicating to IIMs 300 or LINCs 302 with its high-speed communication capability of high-speed communication links 303. One embodiment of sensor 210 includes multiple sensors, for example one sensor for each parameter or type of measurement being made, or one sensor for each related group of parameters or types of measurements being made. One embodiment of sensor module 200 includes a communication module, for the high-speed communication link(s) 303, coupled to a processor, which operates or communicates with the sensor 210, for the capability 212.

FIG. 3 is a diagram illustrating an impedance injection module (IIM) according to one embodiment. Referring to FIG. 3, an enhanced IIM 300 includes measurements processing and reporting capability 310 added to standard dynamic and intelligent local control capability 312. The built-in capability 314 can measure and report line conditions, including voltage and/or current, while capability 316 can receive and process measurement data from other independent sensors. Using high-speed communication capability 318, IIM 300 may communicate with one or more LINCs 302 and independent sensors through high-speed communication links 303. In one embodiment, IIM 300 may respond to specific injection settings provided by LINCs 302 by injecting voltage or impedance into a transmission line (e.g., HV/MV transmission lines 108). The specific injection settings provided by the LINCS 302 may comprise local control instructions generated by the LINCs 302 or control instructions received by the LINCs 302 from the system utility over the communication connection 305 and interpreted and provided to the IIMs 300, to achieve one or more functional aims of the power grid system 100. One embodiment of IIM 300 includes a communication module, for the high-speed, that is sub-cyclic in nature, communication link(s) 303, coupled to a processor, which performs programmed actions for the dynamic and intelligent local control capability 312 and operates or communicates with sensors for the built-in capability 314 and the capability 316.

Figure 4:
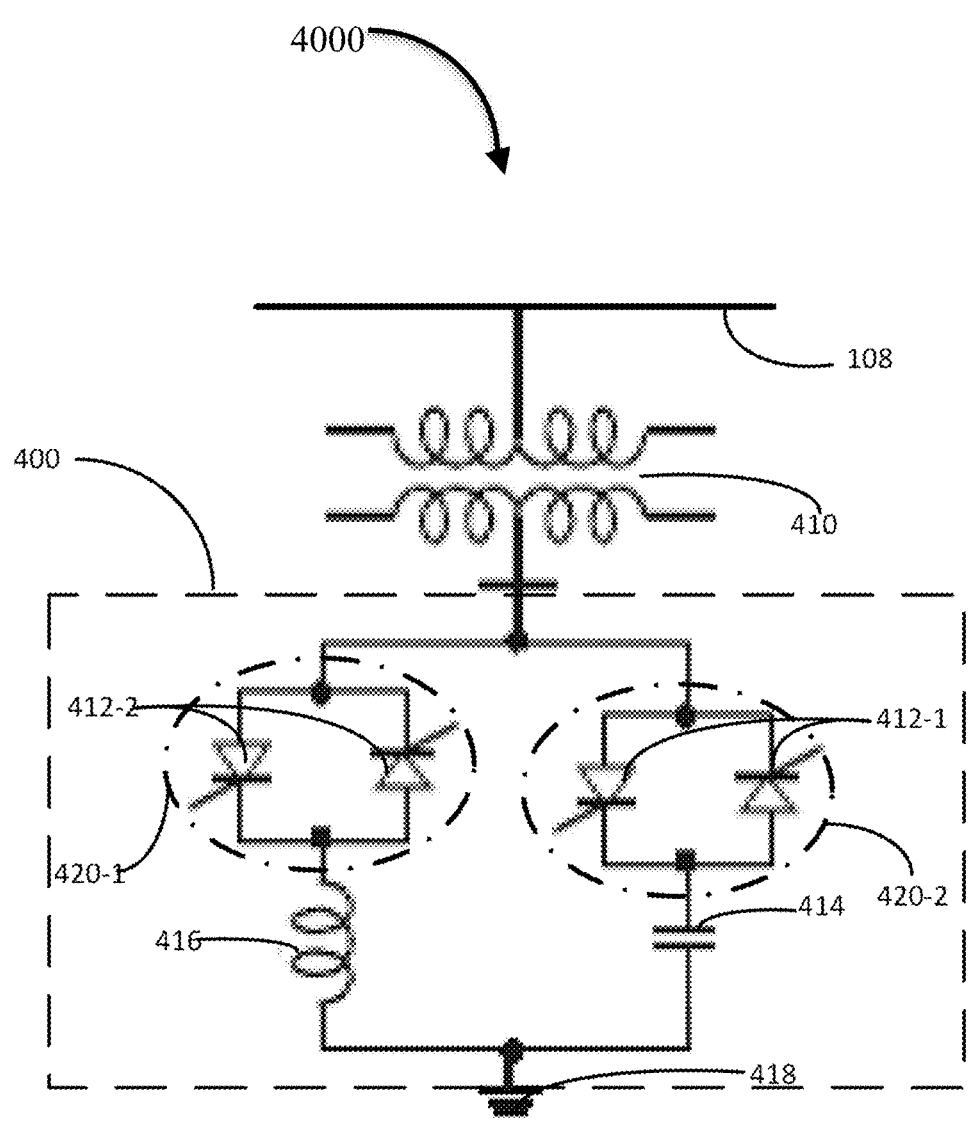
FIG. 4 is a schematic diagram showing a structure of a SVC, a FACTS based shunt control device, capable of providing reactive power, inductive or capacitive, to the grid upon demand for voltage stability control of the power grid.

FIG. 4 is a schematic diagram showing a system 4000 having a structure of the static VAR compensator (SVC) 400 connected to the power grid. The SVC 400 is a FACTS based shunt control device, capable of providing reactive power, inductive or capacitive, to the grid transmission lines 108 upon demand for voltage stability control of the power grid transmission line 108. The SVC 400 is coupled to the power grid transmission lines 108 through transformer 410, and connected to ground 418 through a ground connection. The SVC 400 comprises one or more sets of FACTS based switches such as 420-1 and 420-2, typically using pairs of power switches or powers switching elements 412-1 and 412-2 that may comprise thyristors, SCRs (silicon controlled rectifiers) or IGBTs (insulated gate bipolar transistors). In the example in FIG. 4, the power switch 420-1 (SCR based) is shown connecting to an inductor 416 and the power switch 420-2 connecting to a capacitor 414. By controlling the switching of the IGBTs, it is possible to connect the inductor or the capacitor to the power grid to meet the reactive component needed.

Figure 5:
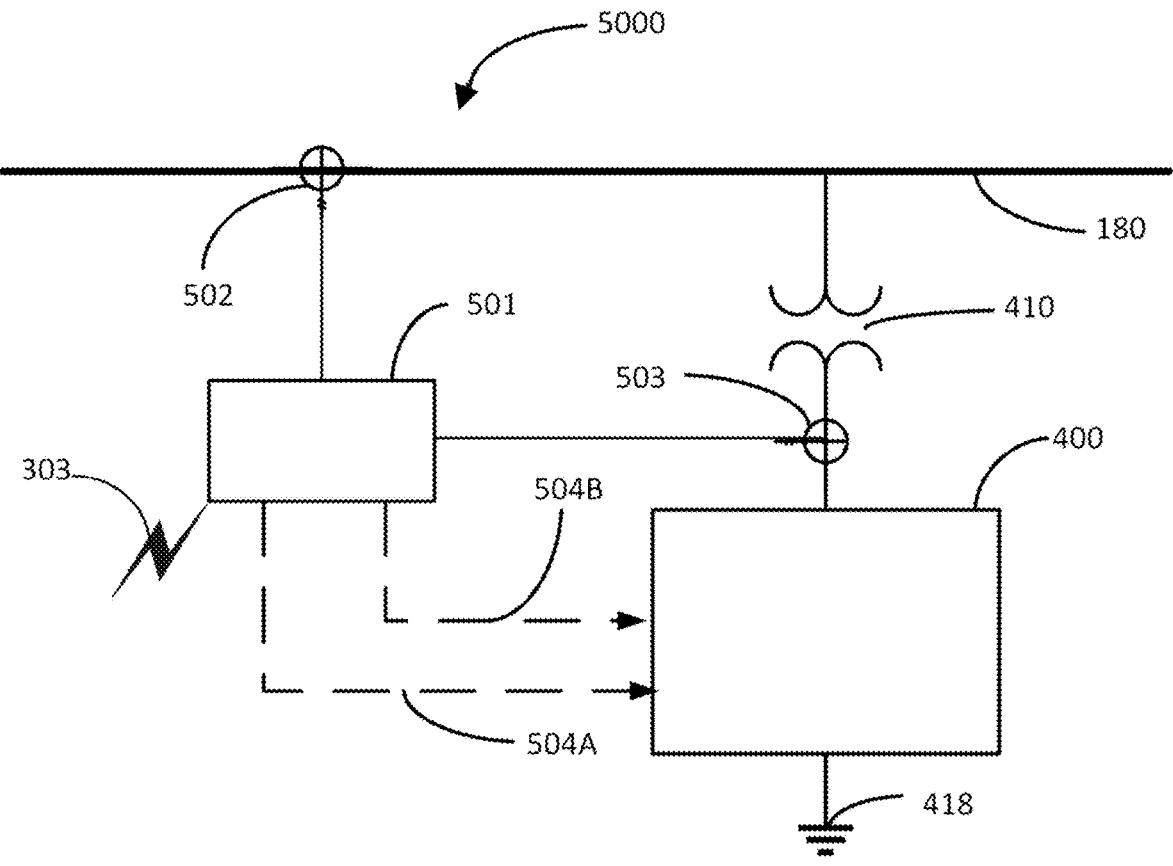
FIG. 5 is a schematic diagram illustrating an example control circuit used with FACTS controlled SVCs.

FIG. 5 is a block diagram illustrating an example control circuit, shunt device system 5000 that enables the switching of the switches 420-1 and 420-2 based on the sensed voltage conditions by the sensors 503 and 502. The sensed voltage is fed to an intelligent controller 501 in the shunt device system 5000 having sufficient processing capability to generate the switch control voltages 504-1 and 504-2 for controlling the switch circuits such as switches 420-1 and 420-2 of the SVC 400 or other shunt device in the shunt device system 5000, and provide the reactive component of power demanded by the power grid to overcome the voltage instability and stabilize the grid voltage. The communication link 303 is used by the controller 501 for sending real time operating data sensed by the sensors 502 and 503 to the optimization engine 900 (see FIG. 9) and also for receiving control instructions and providing response to such instructions. These control instructions may comprise inputs from the local LINCs 302 or instructions from the supervisory utility 206 provided to the LINCs 302 via the communication connection 305 to be executed by the FACTS based shunt device system 5000 for achieving specific functional aims of the power grid system 100.

The real-time measurement data allow the supervisory utility 206 to push the operational envelopes of the power grid (e.g., power grid 910 or 920) as an optimization engine 900 (as described in more detail herein below) can use the real time data to increase the utilization of the overall system by not having to assume the static worst-case operating scenarios of the rated components.

Figure 6:
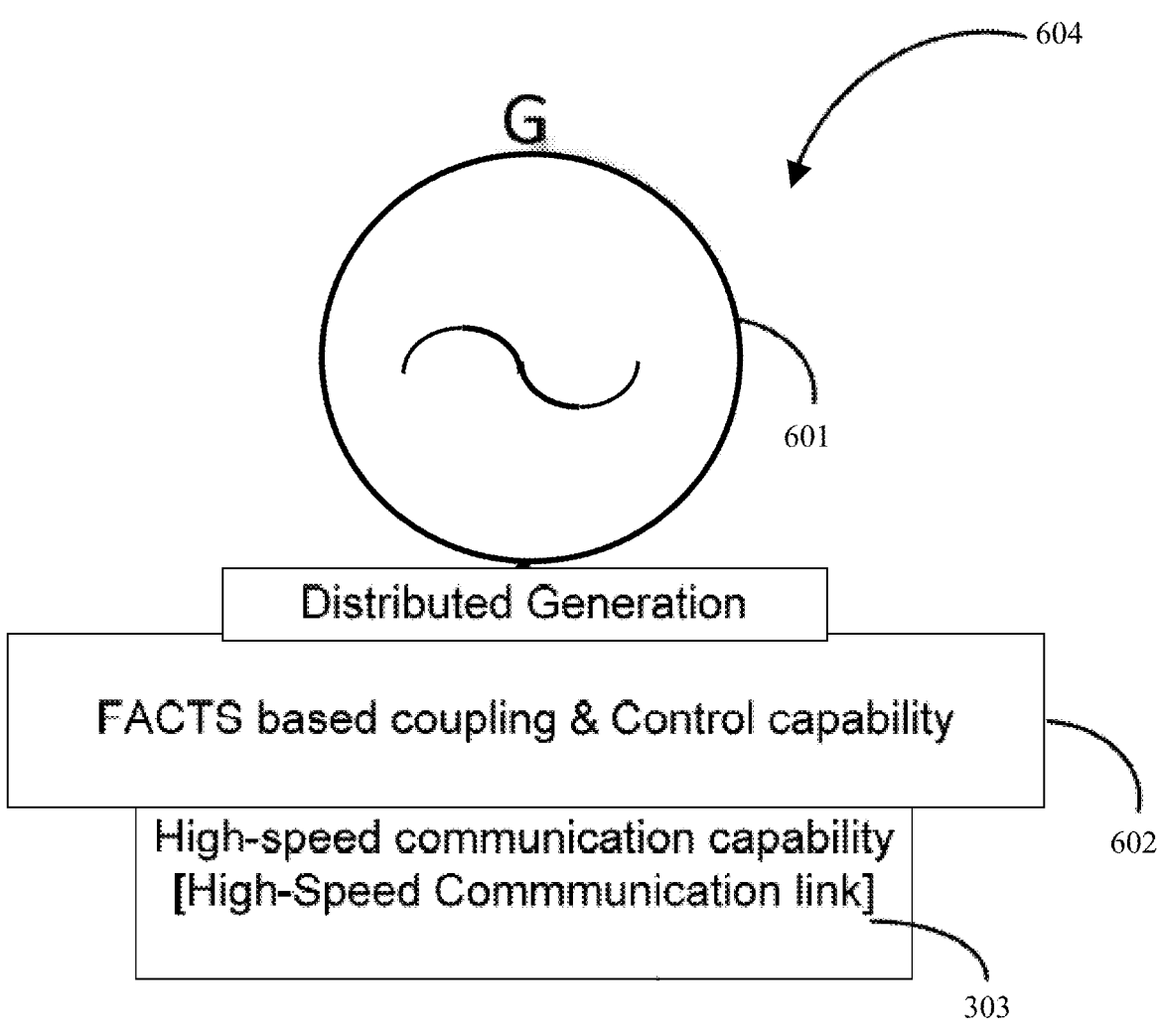
FIG. 6 is a block diagram illustrating FACTS based coupling and control capacity for distributed generators.

FIG. 6 is a block diagram illustrating an example system 604 having a FACTS based control capability 602 for coupling distributed generators 601. In an embodiment, the control capability 602 is implemented with a processor (e.g., controller 501 in shunt device system 5000) and is used to couple the distributed generators 601 (e.g., distributed green natural source based generators) to power grid transmission lines 108 of FIG. 1B. The distributed generators 601 may be distributed across the power grid transmission lines 108. Each control capability 602 is communicably coupled to at least one LINC 302 using high speed communication link 303 enabling hierarchical control of the total power system. The communication link 303 is used by the controller of the system 604 for receiving control instructions and providing response to such instructions. These control instructions may comprise inputs from the local LINCs 302 or instructions from the supervisory utility 206 provided to the LINCs 302 via the communication connection 305 to be executed by the controller of the system 604 for achieving specific functional aims of the power grid system 100.

Figure 7:
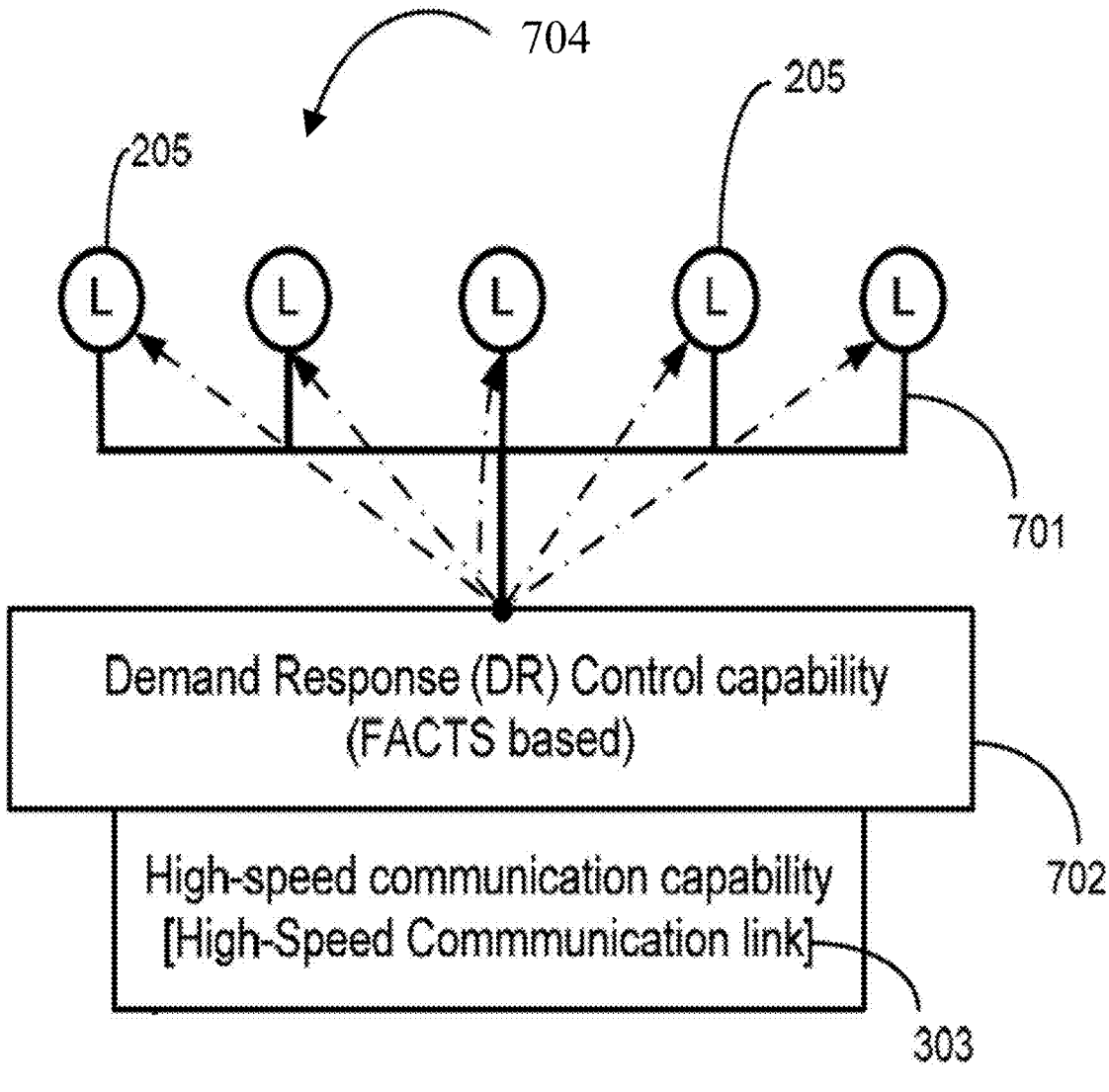
FIG. 7 is a block diagram illustrating FACTS based demand response capability coupling load circuits to the power grid.

FIG. 7 is a block diagram illustrating an example system having FACTS based demand response (DR) control capability 702 and distributed loads 700 shown as loads 205 on load bus 701. The DR control capability 702 may be implemented through a processor (e.g., controller 501 in shunt device system 5000) and be used to link the loads 205, connected to load bus 701, to the power grid system 100. The demand response (DR) control capability 702 connects the load 205 to the power grid and provides demand based power flow control to the connected loads 205. The DR system also includes the high-speed communication link 303 connecting the DR system to the LINCs and hence to the supervisory utility 206 to provide the necessary feedback and receive control instructions through the established hierarchical control capability of the power grid system 100.

Figure 8:
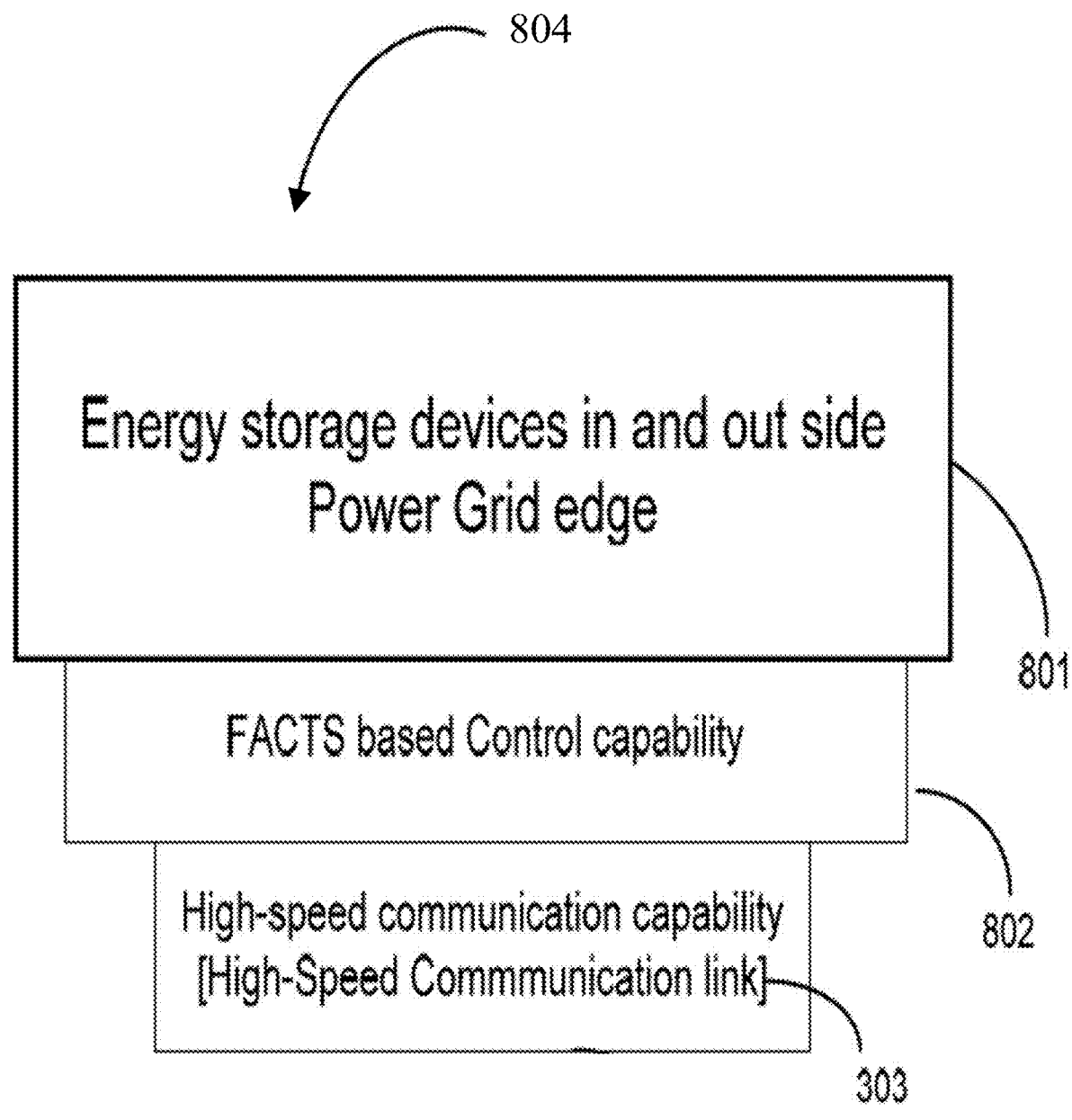
FIG. 8 is a block diagram illustrating the FACTS coupling and control capability for storage devices connecting them to the power grid.

FIG. 8 is a block diagram illustrating a system 804 having a communication enabled FACTS based control capability 802 implemented through processing and communication (e.g., controller 501 and communication link 303 in shunt device system 5000) that can couple to and control the operation of power storage devices 801 connected to the power grid system 100 within, at the edge, or outside the power grid system 100. These power storage device controllers are also in communication with the LINCS 302 and/or the supervisory utility 206, enabling hierarchical control of the grid system.

Figure 9:
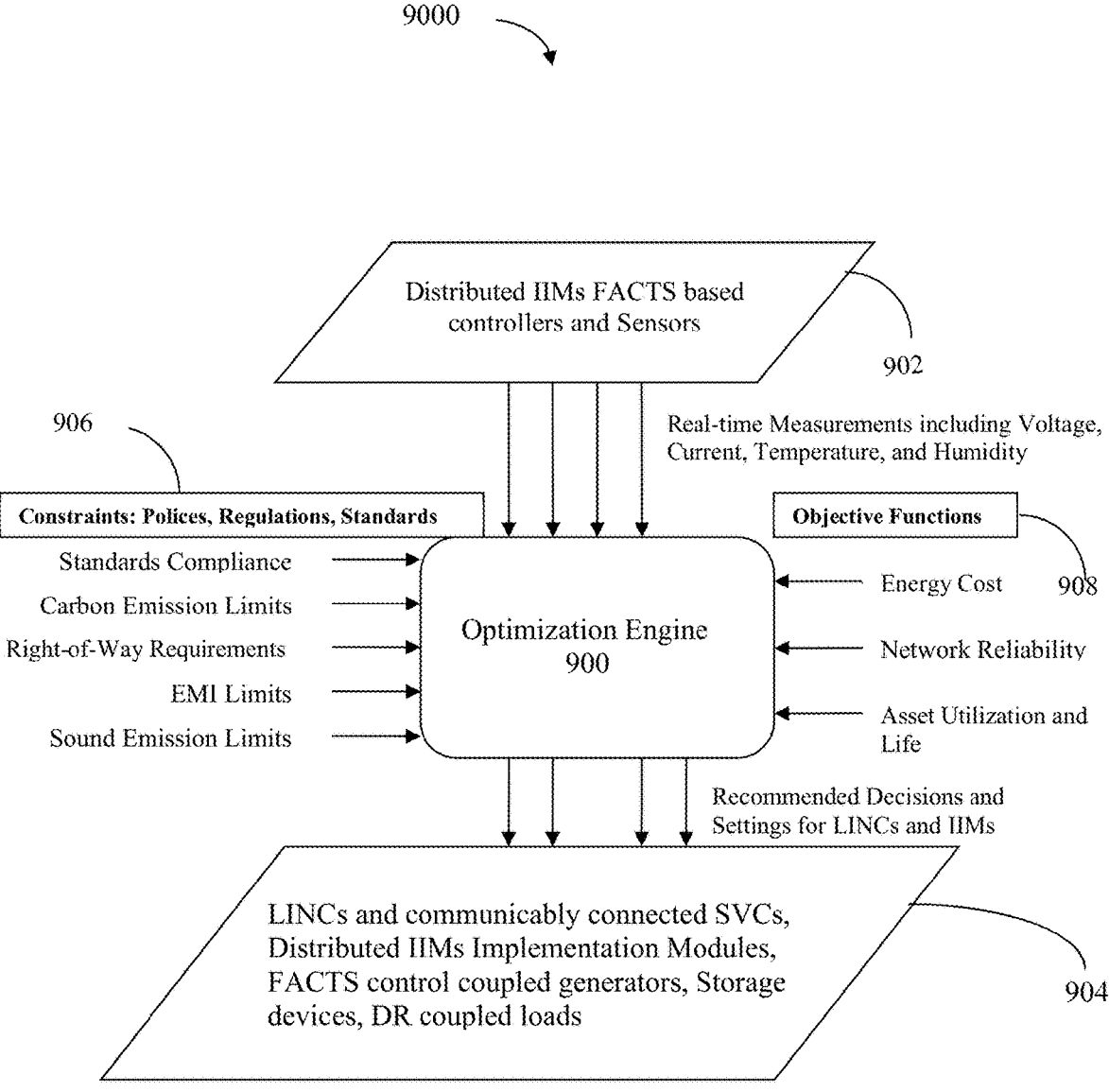
FIG. 9 is a diagram illustrating an example optimization system according to one embodiment.

FIG. 9 is a diagram illustrating an optimization system according to one embodiment. In FIG. 9, optimization system 9000 may include optimization engine 900 with its external interfacing modules, which can be implemented with software executing on a processor, firmware, hardware, or combinations thereof in various embodiments. The optimization engine 900 may be implemented using an FPGA, Integrated circuit (IC) or a system on Chip (SOC). In one embodiment, the optimization engine 900 may be performed by and implemented in a supervisory utility (e.g., supervisory utility 206 of FIG. 1B). In one embodiment, measurement input, for example in a measurement input module in system 9000, includes the SVCs 400, the sensors 902, and LINCs 302 and distributed or deployed IIMs 300 of the implementation module 904. Optimization engine 900 may be further configured to take input parameters, such as the policies and local requirements or rules as constraints 906, and energy cost, network reliability, and asset utilization and life as objective functions 908. Optimization engine 900 incorporates the real-time measurements, including current, voltage, temperature, humidity, noise, wind speed, geomagnetically induced current (GIC) vibration, as provided by distributed or deployed IIMs and other sensors 902, to perform comprehensive dynamic line rating (DLR) and real-time thermal rating (RTTR) as opposed to operating the power grid with static worst-case engineering operating assumptions. The inclusion of the real-time sensor measurements can improve and enhance the utilization of the whole power grid. In one embodiment, constraints 906 and/or the real-time measurements are utilized to optimize (e.g., minimize or maximize) one or more of the objective functions 908 of the power grid system 100.

Constraints consist of policies, regulations, and standards 406 on the power system include standard compliance, carbon emission limits, right-of-way management requirements, and other local environmental issues such as EMI limits, sound emission limits, etc.

1. Standard compliance: By using the intelligent IIMs distributed over or deployed along the high-voltage power and medium-power lines of the grid, the utility is able to establish rules to be implemented by the distributed or deployed IIMs injecting impedance or voltage for optimized power transfer capabilities of the plurality of power grids connecting the generators to distribution points and keep the grid operating within the standard compliance limits of current and voltage.

2. Carbon emission limits: Use of least carbon-intensive energy sources from environmentally friendly wind, solar, geothermal, tidal or wave sources for demand fluctuations allow the system to reduce and optimize the carbon emission and meet policy constraints set by the government and the utility.

3. Right-of-way management requirements: In some areas there are constraints that limit the power line rating during certain time periods. It is difficult for the utility to control this and accept right-of-way in these locations. By having the local control capability to adjust power transfer over HV and MV power lines of the grid based on pre-established rules, the utility is able to cater to the local rules and constraints and still use the right-of-way.

4. Electromagnetic Interference (EMI) limits: This again can be linked to the local environmental needs established, which specify EMI limits during certain times for the safety and health of the local population. By having the ability to limit the current through the power grid and divert power to alternate grid connections during these times, the utility is able to cater to the needs and requirements of the local administration and still utilize the available capacity of these HV and MV power lines.

5. Sound emission limits: This again can be linked to the local environmental needs established, which specify limits for the fundamental frequency, e.g., 50 or 60-Hz, 60-Hz, hum of the power lines during quiet times for the comfort and health of the local population. By having the ability to limit the current through the power grid and divert power to alternate grid connections during these times, the utility is able to cater to the needs and requirements of the local administration and still utilize the available capacity of these HV and MV power lines.

While meeting these requirements, this optimization engine aims to optimize one or more of a set of objective functions 908, including energy cost, network reliability, asset utilization and asset life.

1. Optimization of energy cost: Energy cost has multiple components, including where the power is purchased from, how generators are scheduled, power transfer efficiency of the grid, etc. Having a unified control capability using edge connected FACTS controllers allows lowest-cost power sourcing into the grid at any time from the power generation capability, such as standard generators, distributed generators or stored power, using per established rules. This facilitates the lowest-cost energy sources and storage to be used while employing the next level (cost-wise more expensive) sources to cover intermittent and peak demands. Using the distributed or deployed IIMs to enable optimized power transfer over the grid also reduce the losses in transmission and reduce the cost of power.

2. Optimization of network reliability: With real-time line conditions and information, new generators can be brought online as necessary and power flow can be re-distributed by the optimization engine to improve network reliability and avoid outage with appropriately defined reliability metrics.

3. Optimization of asset utilization and life: Most of the elements of the grid and attached devices, such as HV and MV power lines, switches, transformers, connectors, etc. have a normal power handling capability and a peak power handling capability. The power ratings are also impacted by the local environmental conditions. The optimal power capability has to be de-rated, under adverse local conditions, for the devices to maintain lifetime of the asset. Using the power system elements at the higher stress level as provided by the peak power capability even for short periods of time tends to reduce their life expectancy due to accelerated aging. By having an integrated control capability, with localized fast control capability established by the high-speed communication links, the utility can establish power handling rules that can be implemented by the connected sensors and control modules to limit any overstressing of the various elements and devices on the grid even under adverse local conditions. By having an integrated communication and control capability it is possible to have a more level and even utilization of resources as demands change and availability change on the power system. The sensors and FACTS based controllers, working together with the supervisory utility, are able to control the input from the sources and storage resources, and to control the flow of power in the available power lines of the grid in a timelier fashion to use all available resources optimally. This utilization optimization leads to better asset life management and improves the return on investment for the utilities.

Based on policy related requirements, the output of the optimization engine 900 produces decisions and changes (i.e., recommended or optimal decisions and settings) for LINCs 302 and impedance IIMs 300 for implementation. The distributed or deployed IIMs and other FACTS-based controllers implement the optimization based on local conditions identified and constraints provided to the optimization engine. Additionally, high-level commands such as priorities and weighting factors can be sent to the controllers to fine-tune the implementations at each controller.

All the inputs and outputs may be location-specific and time-dependent in the optimization process.

Figure 10:
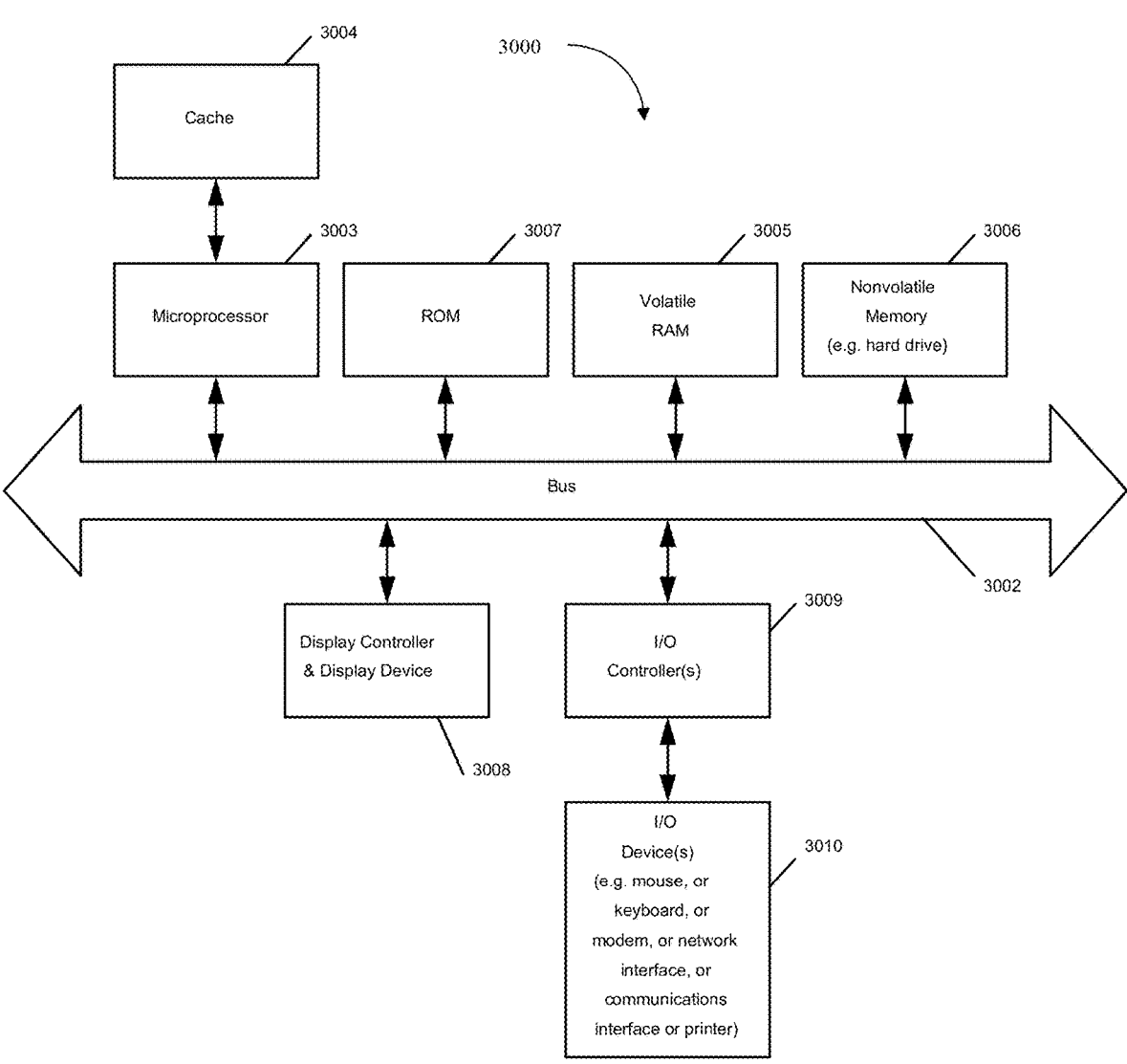
FIG. 10 is a block diagram of a data processing system according to one embodiment.

FIG. 10 is a block diagram of a data processing system according to one embodiment. For example, system 3000 may be used to execute optimization engine 900 as shown in FIG. 9 and generate control instructions for the switches in SVC 400 shown in FIG. 4. In one embodiment, system 3000 may be disposed within supervisory utility 206, shown in FIG. 1B. Note that while FIG. 10 illustrates various components of a computer system, it is not intended to represent any particular architecture or manner of interconnecting the components; as such details are not germane to the application. It will also be appreciated that network computers, handheld computers, mobile devices (e.g., smartphones, tablets) and other data processing systems which have fewer components or perhaps more components may also be used with the application. The system 3000 of FIG. 10 may, for example, be a host or a server.

As shown in FIG. 10, the system 3000, which is a form of a data processing system, includes a bus or interconnect 3002 which is coupled to one or more microprocessors 3003 and a ROM 3007, a volatile RAM 3005, and a non-volatile memory 3006. The microprocessor 3003 is coupled to cache memory 3004. The bus or interconnect 3002 interconnects these various components together and also interconnects these components 3003, 3007, 3005, and 3006 to a display controller and display device 3008, as well as to input/output (I/O) devices 3010, which may be mice, keyboards, modems, network interfaces, printers, and other devices, which are well-known in the art.

Typically, the input/output devices 3010 are coupled to the system through input/output controllers 3009. The volatile RAM 3005 is typically implemented as dynamic RAM (DRAM) which requires power continuously in order to refresh or maintain the data in the memory. The non-volatile memory 3006 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 10 shows that the non-volatile memory is a local device coupled directly to the rest of the components in the data processing system, a non-volatile memory that is remote from the system may be utilized, such as, a network storage device which is coupled to the data processing system through a network interface such as a modem or Ethernet interface. The bus or interconnect 3002 may include one or more buses connected to each other through various bridges, controllers, and/or adapters, as is well-known in the art. In one embodiment, the I/O controller 3009 includes a Universal Serial Bus (USB) adapter for controlling USB peripherals. Although not shown in FIG. 10, I/O controller 3009 may further include a network interface device that may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

While the disclosure has been described in terms of several embodiments, those of ordinary skill in the art will recognize that the invention is not limited to the embodiments described, but can be practiced with modification and alteration known to practitioners of the art. These modifications and alternate practices, though not explicitly described, are covered under the current application. The practice of the invention is further covered within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

What is claimed is:

1. A system for optimized control of a high-voltage or medium-voltage power grid with dynamic line rating and real-time thermal rating, the system comprising:

a flexible alternating current transmission system (FACTS)-based shunt device;

a data processing system comprising an optimization engine configured to receive real-time measurements of sensors on the power grid, constraints, and objective functions, as input parameters, generate control instructions that satisfy the constraints and achieve the objective functions, and output the control instructions, wherein the constraints are determined based on at least one of policies, regulations, or standards imposed on the power grid;

a shunt controller configured to:

communicate and cooperate with one or more of a plurality of localized intelligence centers (LINCs) in a hierarchy comprising a supervisory utility communicably coupled to the plurality of LINCs, and, control the FACTS-based shunt device in accordance with the control instructions to provide reactive power to the power grid for at least one of: voltage stability, delivery of current, power factor control, control of load imbalances, enhancement to grid inertia, or local reaction to disturbances on the power grid; and, a plurality of FACTS-based controllers communicably coupled to at least one of the plurality of LINCs, the plurality of FACTS-based controllers configured to perform dynamic line rating (DLR) and real-time thermal rating (RTTR) on the power grid in accordance with the control instructions.

2. The shunt system of claim 1, wherein the FACTS-based shunt device comprises a static volt-ampere reactive compensator.

3. The shunt system of claim 1, wherein the shunt controller is configured to communicate and cooperate with the one or more of the plurality of LINCs comprises the shunt controller is configured to provide feedback and receive the control instructions through the one or more of the plurality of LINCs, to implement demand response control capability.

4. The shunt system of claim 1, wherein the shunt controller is configured to communicate and cooperate with the one or more of the plurality of LINCs comprises the shunt controller is configured to receive input from the one or more of the plurality of LINCs as local input from local LINCs.

5. The shunt system of claim 1, wherein the shunt controller is configured to communicate and cooperate with the one or more of the plurality of LINCs comprises the shunt controller is configured to receive the control instructions through the one or more of the plurality of LINCs.

6. The shunt system of claim 1, wherein the shunt controller is configured to communicate and cooperate with the one or more of the plurality of LINCs comprises the shunt controller is configured to send the real-time measurements of the sensors to the optimization engine, receive the control instructions from the optimization engine, and generate switch control voltages in accordance with the control instructions for controlling switches of the FACTS-based shunt device to provide the reactive power to the power grid.

7. The shunt system of claim 1, wherein the data processing system is included in the supervisory utility.

8. The shunt system of claim 1, wherein the shunt controller is configured to communicate and cooperate with the one or more of the plurality of LINCs comprises the shunt controller is configured to couple to and control operation of power storage devices that are connected to the power grid and in communication with the plurality of LINCs or the supervisory utility.

9. A method performed by a shunt controller of a flexible alternating current transmission system (FACTS)-based shunt system in a high-voltage or medium-voltage power grid, the method comprising:

receiving, by an optimization engine of data processing system, real-time measurements of sensors on the power grid, constraints, and objective functions, as input parameters, wherein the constraints are determined based on at least one of policies, regulations, or standards imposed on the power grid;

generating, by the optimization engine, control instructions that satisfy the constraints and achieve the objective functions;

outputting, by the optimization engine, the control instructions;

communicating and cooperating, by a shunt controller, with one or more of a plurality of localized intelligence centers (LINCs) in a hierarchy in the power grid, the hierarchy comprising a supervisory utility communicably coupled to the plurality of LINCs;

controlling, by the shunt controller, a FACTS-based shunt device in accordance with the control instructions to provide reactive power to the power grid for at least one of: voltage stability, delivery of current, power factor control, control of load imbalances, enhancement to grid inertia, or local reaction to disturbances on the power grid; and performing, by a plurality of FACTS-based controllers communicably coupled to at least one of the plurality of LINCs, dynamic line rating (DLR) and real-time thermal rating (RTTR) on the power grid in accordance with the control instructions.

10. The method of claim 9, wherein communicating and cooperating with the one or more of the plurality of LINCs comprises providing feedback and receiving the control instructions through the one or more of the plurality of LINCs, to implement demand response control capability.

11. The method of claim 9, wherein communicating and cooperating with the one or more of the plurality of LINCs comprises receiving input from the one or more of the plurality of LINCs as local input from local LINCs.

12. The method of claim 9, wherein communicating and cooperating with the one or more of the plurality of LINCs comprises receiving the control instructions through the one or more of the plurality of LINCs.

13. The method of claim 9, wherein communicating and cooperating with the one or more of the plurality of LINCs comprises:

sending the real-time measurements from the sensors to the optimization engine;

receiving the control instructions from the optimization engine; and generating switch control voltages in accordance with the control instructions for controlling switches of the FACTS-based shunt device to provide the reactive power to the power grid.

14. The method of claim 9, wherein the data processing system is included in the supervisory utility.

15. The method of claim 9, wherein communicating and cooperating with the one or more of the plurality of LINCs comprises coupling to and controlling operation of power storage devices that are connected to the power grid and in communication with the plurality of LINCs or the supervisory utility.

16. One or more tangible, non-transitory, computer-readable medium having instructions thereupon which, when executed by one or more processors, cause the one or more processors to perform operations comprising:

receiving, by an optimization engine of a data processing system, real-time measurements of sensors on the power grid, constraints, and objective functions, as input parameters, wherein the constraints are determined based on at least one of policies, regulations, or standards imposed on the power grid;

generating, by the optimization engine, control instructions that satisfy the constraints and achieve the objective functions;

outputting, by the optimization engine, the control instructions;

communicating and cooperating, by a shunt controller, with one or more of a plurality of localized intelligence centers (LINCs) in a hierarchy in the power grid, wherein the hierarchy comprises a supervisory utility communicably coupled to the plurality of LINCs;

controlling, by the shunt controller, a flexible alternating current transmission system (FACTS)-based shunt device in accordance with the control instructions to provide at least one of: voltage stability, delivery of current, power factor control, control of load imbalances, enhancement to grid inertia, or local reaction to disturbances on the power grid; and performing, by a plurality of FACTS-based controllers communicably coupled to at least one of the plurality of LINCs, dynamic line rating (DLR) and real-time thermal rating (RTTR) on the power grid in accordance with the control instructions.

17. The one or more tangible, non-transitory, computer-readable medium of claim 16, wherein communicating and cooperating with the one or more of the plurality of LINCs comprises receiving input from the one or more of the plurality of LINCs as local input from local LINCs.

18. The one or more tangible, non-transitory, computer-readable medium of claim 16, wherein communicating and cooperating with the one or more of the plurality of LINCs comprises receiving the control instructions through the one or more of the plurality of LINCs.

19. The one or more tangible, non-transitory, computer-readable medium of claim 16, wherein communicating and cooperating with the one or more of the plurality of LINCs comprises:

sending the real-time measurements of the sensors to the optimization engine;

receiving the control instructions from the optimization engine; and generating switch control voltages in accordance with the control instructions for controlling switches of the FACTS-based shunt device to provide the reactive power to the power grid.

20. The one or more tangible, non-transitory, computer-readable medium of claim 16, wherein communicating and cooperating with the one or more of the plurality of LINCs comprises coupling to and controlling operation of power storage devices that are connected to the power grid and in communication with the plurality of LINCs or the supervisory utility.

* * * * *